2,958,613
WATER- AND OIL-REPELLENCY AGENTS AND PROCESS OF MAKING SAME

Jerry A. Nelson, Newark, Del., Thomas G. Miller, Easton, Pa., and Kenneth C. Smeltz, Wilmington, Del., assignors to E. I. du Pont de Nemours and Company, Wilmington, Del., a corporation of Delaware No Drawing. Filed Jan. 21, 1959, Ser. No. 788,052

10 Claims. (Cl. 117—121)

This invention relates to novel oil-repellency agents which are obtained by reaction of formaldehyde with fluoroalkyl carbamates of the formula $$X(CF_2)_nCH_2\text{—}O\text{—}CONH_2 \qquad (1)$$

wherein X stands for hydrogen or halogen (particularly a low atomic weight halogen, such as F or Cl), and $n$ is an integer ranging from 7 to 12. Fluoroalkyl carbamates of this type and their mode of synthesis are described and claimed in our copending application of even date herewith, Serial No. 788,065.

It is a primary object of our present invention to provide novel treating agents for textile fiber which will impart thereto oil-repellency effects which are essentially stable to laundering treatments (such as home laundering with soap) followed by ironing. Another object is to provide agents as above which possess the further quality of endowing textile fiber also with a reasonable degree of water repellence and soil repellence. Additional objects and achievements of this invention will appear as the description proceeds.

As already indicated, the above objects are achieved, according to this invention, by reacting with formaldehyde the fluoroalkyl carbamates of Formula 1 above. Not all reaction products of the two named agents result in compounds having wash-resistant oil-repellent qualities. We find, however, that if the reaction is carried out under strongly acid conditions, the product generally consists of a mixture of two principal components, which can be readily separated by distillation. One of these is directly suitable for application to the fiber (from organic solvent solution or aqueous dispersion) to produce thereon the desired effect (i.e. wash-resistant water- and oil-repellancy). The other one is not directly suitable for this purpose, but can be readily converted into the first mentioned reagent by further reaction with formaldehyde under acid conditions.

According to our investigations and analyses, the product which is directly suitable for the purpose of this invention is a compound containing four fluoroalkyl carbamato chains interconnected by three methylene bridges, according to the formula

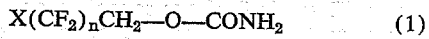

wherein Y designates the perfluoroalkyl-carbo radical $$X(CF_2)_n\text{—}CH_2O\text{—}CO\text{—}$$

(X and $n$ having the same meaning as above). We prefer to name this compound N,N'-methylene-di(methylene-bis-perfluoroalkyl carbamate).

The other component is a simple bis-carbamate of the formula $$Y\text{—}NH\text{—}CH_2\text{—}NH\text{—}Y \qquad (3)$$

wherein Y has the same meaning as above. When reacted with formaldehyde under strongly acid conditions in an organic solvent, this simple bis compound gives the di-bis compound of Formula 2 above.

The initial materials of Formula 1 above required for this invention are prepared as more fully described and claimed in our said copending application, Serial No. 788,065. But a brief resume of such synthesis is as follows:

Alcohols of the formula $H(CF_2)_n\text{—}CH_2OH$, ($n=7$ to 12), or of the formula $Z(CF_2)_n\text{—}CH_2OH$, ($Z=F$ or Cl, $n=7$ to 12), which alcohols are per se known, are reacted with phosgene in the presence of a tertiary nitrogenous base to give fluoroalkyl chloroformates of the formula $$X(CF_2)_n\text{—}CH_2O\text{—}COCl \qquad (4)$$

wherein X is H or halogen, and $n=7$ to 12. These compounds are then reacted in an organic solvent medium with ammonia, preferably under an inert atmosphere, to produce the carbamates of Formula 1 above.

In the process of the instant invention wherein the fluoroalkyl carbamate is reacted with formaldehyde, the reaction is carried out in an organic liquid which is a solvent for the carbamate, but which is inert to the reactants and product. The usual organic solvents can be employed, as for example the aromatic hydrocarbons such as benzene, toluene, xylene, etc.; the ethers such as diethyl ether, dioxane, tetrahydrofuran, etc.; acids such as glacial acetic acid; and other customarily used inert organic solvents. It is necessary to have a catalytic amount of an acid present in the reaction medium, and either inorganic or organic acids may be used. Preferably, a strong acid such as p-toluene-sulfonic acid will be used. Alternately, HCl gas, for example, can be passed through the reaction medium. The temperature at which the process is carried out is not critical and will usually be between about 35° C. and 150° C., although 90° C. to 120° C. is preferred.

The formaldehyde used for reaction may be passed into the reaction mixture as a gas, or a formaldehyde generator may be used. These generators are polymers of formaldehyde and evolve formaldehyde on heating. These compounds are well known and easily available as various forms of paraformaldehyde. The amount of formaldehyde used will usually vary from 0.5 mole of formaldehyde per mole of the carbamate to 3 moles of formaldehyde per 4 moles of the same. A one-to-one molar ratio is convenient and provides an excess of formaldehyde over the theoretical amount required.

The reaction proceeds rapidly and is completed in about one-half to one hour although in some cases longer times are required.

Of the products obtained, 50% to 70% by weight is the desired product, the balance being the methylene-bis-fluoroalkyl carbamate.

Although two —NH— groups are still present in the desired product, no further reaction with formaldehyde occurs. This lack of further reactivity is believed due to hydrogen bonding which occurs within the molecule.

The N,N'-methylene-di(methylene-bis-perfluoro-alkyl carbamates) of this invention are separated from the reaction product mixture by sublimation at about 150° C. to 200° C. at reduced pressure. The simple methylene-bis-carbamates sublime out of the mixture, leaving behind the desired water- and oil-repellent compositions which are purified by crystallization from organic solvents such as ethanol, chloroform, benzene, carbon tetrachloride, etc. The repellants of this invention are colorless solid powders which have sharp melting points, usually in the range of about 60° C. to 150° C.

The conversion of the simple bis carbamate of Formula 3 above into the desired product of Formula 2 may be achieved in practice by dissolving in a convenient solvent, say toluene, 2 moles of the methylene-bis-carbamate, and adding 1 mole of paraformaldehyde and a catalytic amount of acid, such as p-toluene sulfonic acid.

The reaction mass is heated with agitation at about 90° C. to cause reaction. The latter is completed in about 30 minutes, and the oil-repellent product is obtained by filtering it from the cooled reaction mass. Alternately, it is possible to cause this reaction to occur prior to separating the methylene-bis-carbamate from the reaction mixture. This is done simply by adding additional formaldehyde or formaldehyde generator to the reaction mass and carrying out further reaction.

The novel repellents of this invention are applied to textiles quite easily by treating the textile with an organic solvent solution of repellent, evaporating off the solvent and then heating the treated textile at about 150° C. for about three minutes. Usually the amount of repellent on the fabric will be between about 1% and 10% of the fabric weight. The preferred solvent for the treating solution is acetone, although other solvents such as methyl ethyl ketone, tetrahydrofuran, etc. may be used. Aqueous application methods are also possible from aqueous dispersions of the repellents.

The preferred repellents are those where X is a fluorine atom in the above structures since these compounds give better repellent effects and may be used on cotton, wool, nylon, polyethylene terephthalate, polyacrylonitrile, and other synethetic fibers. Those repellents where X is chlorine or hydrogen are best used on cotton.

Textiles treated with the novel repellents of this invention have water and oil-repellent properties and the repellent action withstands repeated laundering of the textile. It has been observed that after washing the treated textile, the repellency is often much lower than originally. However, it has been further found that simply ironing the washed material increases the repellent effect. Thus, to obtain maximum benefit from these novel agents, the washed fabric should be ironed before use. In addition, the treated textile has the advantage of being resistant to dry soil. This last property is unexpected in view of the fact that it is known that textiles treated with known oil and water repellents which contain fluorine atoms attract dry soil.

The novel compounds of this invention may also be used to treat other materials to impart water and oil repellent properties. For example, surfaces of wood, metals, plastics, glass, etc. may be coated by spray or dip with organic solvent solutions of these agents. After evaporation of the solvent, the compounds remain on the surface and impart the repellent effects.

Without limiting this invention, the following examples are given to illustrate our preferred mode of operation. Parts mentioned are by weight.

*Example 1*

44.3 parts of 1,1-dihydro-perfluorooctyl carbamate (Example 5 of our copending application above referred to), 3.0 parts of paraformaldehyde, 260 parts of dry xylene and 0.1 part of p-toluene-sulfonic acid monohydrate were heated together with agitation at 100° C. for 24 hours.

The xylene solvent was distilled off under vacuum. The residue was taken up in ether and washed with 5% NaOH. The ether was then washed with distilled water until the washings were neutral of pH indicator paper. The ether solution was dried over anhydrous magnesium sulfate. After boiling to dryness, the residue was recrystallized twice from chloroform to give a compound melting at 55° to 59° C. The infrared spectrum showed this to be a mixture of compounds of Formulas 2 and 3 above, Y in this case being the radical $F(CF_2)_7-CH_2O-CO-$.

The two compounds were separated by distillation. After recrystallization from chloroform, the residue had a M.P. of 57° to 60° C. This was the methylene-di-(methylene-bis-carbamate) as shown by its infrared spectrum.

The distillate after two recrystallizations from methanol had a M.P. of 98° to 101° C. and was shown to be the methylene-bis-carbamate by its infrared spectrum.

When a piece of cotton fabric was padded with a 5% solution of the above dimethylene bis compound (M.P. 57° to 60° C.) in acetone and then dried and heated in an air oven at 150° C. for 3 minutes, it acquired an oil-repellency of rating 100+. After 14 washings and ironings by a home laundering procedure, the oil repellency rating remained at 100+.

The fabric treated with the N,N'-methylene-di-(methylene-bis-1,1-dihydro-perfluorooctyl carbamate) and a cotton fabric similarly treated with a commercially available polyfluoroacrylate water- and oil-repellent were each tumbled with a synthetic soil consisting of 70 parts of clay, 26 parts of iron oxide and 4 parts of carbon black. On removal from the soil and shaken lightly to remove excess soil, it was observed that the cotton treated with the compound of this case was white to grey in color while the fabric treated with the commercial product was almost totally black.

*Example 2*

51.9 parts of 1,1-11-trihydro-perfluoroundecyl carbamate (Example 8 of our copending application), 1.44 parts of paraformaldehyde, 195 parts of dry xylene and 0.6 part of p-toluene-sulfonic-acid monohydrate were heated together with agitation at 90° C. for 30 minutes.

Approximately 50% of the xylene solvent was distilled from the reaction mixture using a water aspirator. The remaining solution was cooled to 10° C. using an ice bath and filtered. The residue was taken up in ether and washed with 5% NaOH solution followed by washings of distilled water until the washes were neutral to pH indicator paper. The ether portion was dried over anhydrous magnesium sulfate. After boiling the ether filtrate to dryness, the residue was recrystallized from methanol. The main crop was a white powder, M.P. 113.5° to 116° C.

After distilling the above product, the distillate was recrystallized twice from chloroform containing a small amount of acetone. It had a M.P. of 131° to 132° C., and was shown to be methylene-bis-1,1,11-trihydro-perfluoroundecyl carbamate.

The residue was recrystallized once from chloroform and again from an 80/20 mixture of chloroform and acetone. The resulting white, amorphous powder had a M.P. of 113.5° to 116° C. and was shown by chemical anaylsis to be N,N'-methylene-di(methylene-bis-1,1,11 - trihydro-perfluoroundecyl carbamate).

The infrared spectrum of a Nujol mull showed a small broad peak at $2.97\mu$, twin peaks at 5.73 and $5.77\mu$, a broad medium size peak at $6.54\mu$ and a peak at $13.00\mu$.

This spectrum is distinctive and quite different from the simple methylene-bis-carbamate which has a strong, sharp peak at $2.98\mu$, a strong sharp peak at $5.83\mu$, a strong sharp retained its original rating of 70 after 14 washings and $13.12\mu$ which are missing in the spectrum of the methylene-di(methylene-bis-carbamate).

The same methylene-di-bis compound was also obtained by reacting the fraction of methylene-bis-carbamate, above obtained, with paraformaldehyde in a 2 to 1 molar ratio in xylene using p-toluene-sulfonic-acid monohydrate as catalyst.

When applied to cotton fabric as in Example 1 above, it imparted to the fabric a moderate oil repellency, which retained its original rating of 70 after 14 washings and ironings by a home laundering procedure.

A dry soil test in which the treated fabric and a nontreated control were tumbled with a mixture of 70 parts of clay, 26 parts of iron oxide and 4 parts of charcoal clearly showed the resistance of the treated fabric to dry soil.

*Example 3*

18.3 parts of 1,1-dihydro-11-chloro-perfluoroundecyl carbamate (Example 6 of our copending application), 0.9 parts of paraformaldehyde, 105 parts of dry xylene and 0.03 parts of p-toluene-sulfonic-acid monohydrate were heated together with agitation at 110° C. for 24 hours.

The xylene solvent was stripped off under vacuum. The yellow-brown solid residue was taken up in hot tetrahydrofuran, filtered and the filtrate boiled to dryness on the steam bath. The cream colored solid residue was placed in the large sublimation apparatus and heated at 160° to 180° C. oil bath temperature under high vacuum for a total of 30 hours.

The sublimed material was recrystallized from 95% ethanol to give a white, microcrystalline material, M.P. 131.5 to 132.5° C. The infrared spectrum of a Nujol mull of this compound showed the characteristic strong, sharp peaks of the methylene-bis-carbamate.

The residue was recrystallized from tetrahydrofuran giving a white powdery solid, M.P. 135° to 137° C. The infrared spectrum of a Nujol mull of this material showed the small, broad characteristic peaks of the methylene-di(methylene-bis-carbamate).

When a piece of cotton fabric was treated to deposit 4% by weight of the above obtained N,N'-methylene-di(methylene-bis-1,1-dihydro-11 - chloro-perfluoroundecyl carbamate), as described in the previous examples, it acquired wash-resistant water- and oil-repellent effects.

In a manner similar to the above examples, other carbamate compounds within the scope of Formula 1 above may be converted into valuable oil-repellent agents, whose chief characteristic is their outstanding fastness to washing.

The oil-repellency ratings mentioned in the above examples are obtained by a test which is based on the different penetrating properties of mineral oil ("Nujol") and n-heptane into the treated fabric. Mixtures of these two hydrocarbon liquids, which are miscible in all proportions, show penetrating properties proportional to the amount of n-heptane in the mixture.

To measure oil repellency of a treated fabric, 8″ x 8″ swatches of the fabric are placed on a table, and a drop of the test mixture is placed gently onto the fabric surface. After 3 minutes the wetting and penetration of the fabric is visually observed. From the following table, the number corresponding to that mixture which contains the highest percentage of heptane which does not penetrate or wet the fabric is taken as the oil repellency rating.

| Oil Repellency Rating | Percent by Volume Heptane | Percent by Volume "Nujol" |
| --- | --- | --- |
| 100+ | 60 | 40 |
| 100 | 50 | 50 |
| 90 | 40 | 60 |
| 80 | 30 | 70 |
| 70 | 20 | 80 |
| 50 | 0 | 100 |
| 0 | | (¹) |

¹ No resistance to "Nujol" (i.e. penetration within 3 minutes).

Usually, acceptable ratings are 70 and above, although beneficial effect to oil staining is sometimes obtained with ratings as low as 50.

It will be understood that the details of the above examples may be varied within the skill of those engaged in this art. For instance, in using the novel compounds of this invention, in lieu of heating the impregnated and dried fabric at 150° C. for 3 minutes, any equivalent baking treatment may be applied to the fabric, such as heating at any temperature in the range of 125° to 160° C. for a period of time varying inversely with the temperature from 30 seconds to 10 minutes.

We claim as our invention:

1. A compound being the reaction product, produced under strongly acid conditions, of formaldehyde with a carbamate of the structure $$X(CF_2)_nCH_2O-CO-NH_2$$

wherein X is an atom of the group consisting of hydrogen, fluorine and chlorine, and $n$ is an integer in the range of 7 to 12, inclusive.

2. A reaction mass comprising in admixture compounds of the formulas

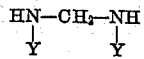

and

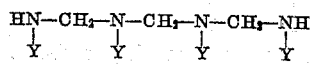

wherein Y represents the radical $$-CO-OCH_2-(CF_2)_nX$$

X being an atom of the group consisting of hydrogen, fluorine and chlorine, while $n$ is an integer in the range of 7 to 12, inclusive.

3. A compound having the formula

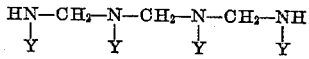

wherein Y represents the radical $$-CO-OCH_2-(CF_2)_nX$$

X being an atom of the group consisting of hydrogen, fluorine and chlorine, while $n$ is an integer in the range of 7 to 12, inclusive.

4. A process of rendering textile materials oil- and water-repellent, which comprises impregnating the same from a liquid medium with a compound as defined in claim 3, said liquid medium being selected from the group consisting of organic solvent solutions of said compound and aqueous suspensions of the same, drying the fabric and heating the same at a temperature between 125° and 160° C. for a period of time between 10 minutes and 30 seconds, respectively.

5. A process as in claim 4, wherein the material treated is a member of the group consisting of cotton, wool, nylon, polyethylene terephthalate, and polyacrylonitrile, and X in the compound is fluorine.

6. A process as in claim 4, wherein the material treated is cotton, and X in the compond is hydrogen.

7. The process of producing a compound adapted for use as an oil- and water-repellency agent, which comprises reacting with formaldehyde upon a carbamate having the structure $$X(CF_2)_nCH_2O-CO-NH_2$$

wherein X is an atom of the group consisting of hydrogen, fluorine and chlorine, and $n$ is an integer in the range of 7 to 12, inclusive, the reaction being carried out in an inert organic liquid which dissolves said carbamate and in the presence of a strongly acid catalyst, and recovering from the reaction mass a compound of formula

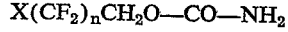

wherein Y represents the radical $$-CO-OCH_2-(CF_2)_nX$$

X and $n$ having the same meaning as above.

8. A compound of the formula $$Y-NH-CH_2-NH-Y$$

wherein Y represents the radical $$-CO-OCH_2(CF_2)_nX$$

X being an atom of the group consisting of hydrogen, fluorine and chlorine, while $n$ is an integer in the range of 7 to 12, inclusive.

9. The process of producing a compound adapted for use as an oil- and water-repellency agent, which comprises reacting formaldehyde with a compond of the formula $Y-NH-CH_2-NH-Y$, wherein Y represents the radical —CO—OCH$_2$(CF$_2$)$_n$X, X being an atom of the group consisting of hydrogen, fluorine and chlorine, while $n$ is an integer in the range of 7 to 12, inclusive, the reaction being carried out at a temperature of at least 90° C., in an inert organic liquid which dissolves said carbamate and in the presence of a strongly acid catalyst, and recovering from the reaction mass a compound of formula

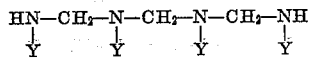

wherein Y has the same meaning as above.

10. The reaction mass comprising in admixture compounds of the formulas

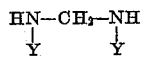 (A)

and

 (B)

wherein Y represents the radical

—CO—OCH$_2$—(CF$_2$)$_n$X

X being an atom of the group consisting of hydrogen, fluorine and chlorine, $n$ is an integer in the range of 7 to 12 inclusive, and the mixture containing from 50% to 70% by weight of product (B), the balance being product (A).

References Cited in the file of this patent

UNITED STATES PATENTS 2,593,737  Diesslin et al. _____ Apr. 22, 1952

UNITED STATES PATENT OFFICE
CERTIFICATE OF CORRECTION

Patent No. 2,958,613              November 1, 1960

Jerry A. Nelson et al.

It is hereby certified that error appears in the printed specification of the above numbered patent requiring correction and that the said Letters Patent should read as corrected below.

Column 1, line 57, after the formula insert "(2)"; column 4, line 21, for "1,1-11-" read -- 1,1,11- --; line 53, strike out "retained its original rating of 70 after 14 washings and", and insert instead -- peak at 6.49μ and peaks at 7.57μ, 10.00μ, 12.70μ and --; column 7, line 13, for "The" read -- A --.

Signed and sealed this 25th day of April 1961.

(SEAL)
Attest:

ERNEST W. SWIDER
Attesting Officer

DAVID L. LADD
Commissioner of Patents